United States Patent
Narancic et al.

(10) Patent No.: US 7,668,849 B1
(45) Date of Patent: Feb. 23, 2010

(54) METHOD AND SYSTEM FOR PROCESSING STRUCTURED DATA AND UNSTRUCTURED DATA

(75) Inventors: Perry J. Narancic, Menlo Park, CA (US); Paul Krneta, San Francisco, CA (US)

(73) Assignee: BMMSoft, Inc., San Francisco, CA (US)

( * ) Notice: Subject to any disclaimer, the term of this patent is extended or adjusted under 35 U.S.C. 154(b) by 147 days.

(21) Appl. No.: 11/298,261

(22) Filed: Dec. 9, 2005

(51) Int. Cl.
*G06F 17/00* (2006.01)
(52) U.S. Cl. ..................... 707/101
(58) Field of Classification Search ......... None
See application file for complete search history.

(56) References Cited

U.S. PATENT DOCUMENTS

| | | | |
|---|---|---|---|
| 6,775,689 B1* | 8/2004 | Raghunandan | 709/206 |
| 2002/0065662 A1* | 5/2002 | Sherman | 704/275 |
| 2005/0108256 A1* | 5/2005 | Wakefield et al. | 707/100 |
| 2006/0122974 A1* | 6/2006 | Perisic | 707/3 |
| 2006/0272006 A1* | 11/2006 | Wei et al. | 726/2 |
| 2006/0288268 A1* | 12/2006 | Srinivasan et al. | 715/505 |
| 2007/0011183 A1* | 1/2007 | Langseth et al. | 707/101 |

OTHER PUBLICATIONS

Ferris Research, "Oracle Content Services: An Alternative to SharePoint Services for Enterprise Content Management," White Paper, Oct. 2005, Report #582, Ferris Research Inc., San Francisco, USA.
Buchheim, Rich, "Oracle Content Services 10g: Content Management for the Rest of Us," White Paper, Jan. 2005, Redwood Shores, USA.
Dicenzo et al., "Magic Quadrant for E-Mail Active-Archiving Market, 2005," Gartner RAS Core Research Note, Apr. 21, 2005, G00127038.
Borun, Jennifer, "Content Management with Oracle Files: A Brief Product Overview," Product Description, 2004.
Zantaz, "Email Archiving—Analyzing the Return on Investment," White Paper.
ORACLE, "Oracle Database: Content Management," (visited Nov. 23, 2005) <http://www.oracle.com/database/cm_home.html>.
ZANTAZ, "Zantaz EAS for Files," Product Data Sheet.
The 451 Group, "Text-Aware Applications: The Endgame for Unstructured Data Analysis," Special Report, Jul. 2005, New York, USA.

* cited by examiner

*Primary Examiner*—Don Wong
*Assistant Examiner*—Belinda Xue
(74) *Attorney, Agent, or Firm*—John P. O'Banion; Michael K. Hsu (57) ABSTRACT

A method for processing data is provided. In this method, unstructured data and structured data are captured and the unstructured data is associated with the structured data. After capture, the unstructured data and the structured data are correlated to define a link between the unstructured data and the structured data. The unstructured data and the structured data then are stored in a data structure based on the link. A system for processing data also is described.

20 Claims, 8 Drawing Sheets

| Table: MESSAGEHEADER Email (501) | |
|---|---|
| MESSAGE_ID | integer NOT NULL, |
| MAIL_ID | varchar(256), |
| MESSAGE_TIME | timestamp, |
| MESSAGETYP_ID | smallint, [from=1, to=2, cc=3, bcc=4] |
| SUBJECT | varchar(128), |
| STATUS | char(1), |
| PUBLISH | char(1), |
| CHECKSUM | varchar(255), |
| RECEIVE_TIME | timestamp, |
| primary key (MESSAGE_ID) | |

520 — MAIL_ID
521 — SUBJECT
522 — RECEIVE_TIME

| Table: MESSAGERECIPIENTS Email (523) | |
|---|---|
| MESSAGE_ID | integer NOT NULL, |
| RECEIPT_ID | smallint NOT NULL, |
| ADD_ID_RECORD | integer NOT NULL, |
| EMAIL_ADDRESS | varchar(128), |
| DOMAIN_ADDRESS | varchar(128), |
| MESSAGERECEIPTTYP | smallint NOT NULL, |
| STATUS | char(1), |
| primary key (MESSAGE_ID, RECEIPT_ID) | |

| Table: MESSAGEATTACHMENTS Email (503) | |
|---|---|
| MESSAGE_ID | integer NOT NULL, |
| ATTACHMENT_ID | smallint NOT NULL, |
| ATTACHMENT_TITLE | varchar(128), |
| CONTENT_TYPE | char(64), |
| ATTACHMENT | long binary, |
| CHECKSUM | varchar(16), |
| LENGTH | integer, |
| primary key (MESSAGE_ID, ATTACHMENT_ID) | |

524 — ATTACHMENT_TITLE

| Table: MESSAGELONGTEXT Email (504) | |
|---|---|
| MESSAGE_ID | integer NOT NULL, |
| TEXTTYP | char(1) NOT NULL, |
| MESSAGETEXT | varchar(4000), |
| Primary key (MESSAGE_ID, TEXTTYP) | |

| Table: ATTACHMENTTEXTS Email (505) | |
|---|---|
| MESSAGE_ID | integer NOT NULL, |
| ATTACHMENT_ID | smallint NOT NULL, |
| IMARCNAME | varchar(200) NOT NULL, |
| SLICE | int NOT NULL, |
| DOCTEXT | varchar(32000) NULL, |
| TIME_PROCESSED | datetime NOT NULL, |

525 — MESSAGETEXT

| TABLE: DOCS DOCUMENT (506) | |
|---|---|
| DOCID | bigint IDENTITY, |
| FILENAME | varchar(200) NOT NULL, |
| FULLPATH | varchar(400) NOT NULL, |
| EXT | varchar(4) NULL |
| SIZE | bigint NOT NULL, |
| CKSUM | bigint NOT NULL, |
| LOADED | date NULL, |
| DOC | long binary NULL, |
| CONSTRAINT pk_bmmdocs PRIMARY KEY (docid) | |

| TABLE: TEXTS DOCUMENT (507) | |
|---|---|
| DOCID | bigint NOT NULL, |
| FILENAME | varchar(200) NOT NULL, |
| TIME_PROCESSED | datetime NOT NULL, |
| EXTRACTOR | varchar(1000) NULL, |
| SLICE | int NOT NULL, |
| MISCINFO | varchar(1000) NULL, |
| DOCTEXT | varchar(32000) NULL |
| CONSTRAINT pk_bmmtexts PRIMARY KEY (docid) | |

METHOD AND SYSTEM FOR PROCESSING STRUCTURED DATA AND UNSTRUCTURED DATA

FIELD OF THE INVENTION

The present invention relates generally to data processing and, more particularly, to methods and systems for processing structured data and unstructured data.

BACKGROUND

Existing technologies associated with data mining and information retrieval are typically single function solutions that are directed to solve a single problem. For example, a World Wide Web (Web) search engine is directed only to search Web pages. Another exemplary single function solution is an email application where only emails can be accessed. Since single function solutions are independent of each other, accessing data using multiple single function solutions can be time consuming, costly, and prone to errors.

Single function solutions are not integrated because the types of data handled by each single function solution are processed differently. For instance, in technologies associated with data mining and information retrieval, data can be classified into unstructured data and structured data. In general, structured data are structured for storage in data structures associated with database management systems while unstructured data are not structured for database management systems. Since unstructured data can be difficult to access and analyze, especially by database management systems, single function solutions usually do not process both structured data and unstructured data. As a result, the difficulties of integrating structured data and unstructured data hinder the access of unstructured data and structured data from different single function solutions.

In view of the foregoing, there is a need for methods and systems for processing data such that unstructured data and structured data can be integrated into and accessed by a single application.

SUMMARY

Broadly speaking, the embodiments of the present invention fill these needs by providing methods and systems for processing data. It should be appreciated that the present invention can be implemented in numerous ways, including as a method, a system, or a device. Several inventive embodiments of the present invention are described below.

In accordance with a first aspect of the present invention, a method for processing data is provided. In this method, unstructured data and structured data are captured and here, the unstructured data is associated with the structured data. After capture, the unstructured data and the structured data are correlated to define a link between the unstructured data and the structured data. The unstructured data and the structured data then are stored in a data structure where the link is preserved. The storage of the unstructured data and the structured data enables access of the unstructured data and the structured data from the data structure.

In accordance with a second aspect of the present invention, a computer readable medium having program instructions for processing data is provided. Program instructions for capturing unstructured data and a first structured data are included. Here, the unstructured data is associated with the first structured data. Accordingly, program instructions are included for extracting a second structured data from the unstructured data and program instructions for correlating the first and second structured data to define a link between the first and second structured data. Furthermore, program instructions are included for storing the first and second structured data in a data structure with the link being preserved in the data structure.

In accordance with a third aspect of the present invention, a system for processing data is provided. The system includes a memory configured for storing a data processing module and for storing a processing unit configured for executing the data processing module stored in the memory. The data processing module includes program instructions for receiving unstructured data and structured data from a plurality of sources, and the unstructured data is associated with the structured data. Additionally included are program instructions for correlating the unstructured data and the structured data to define a link between the unstructured data and the structured data, and program instructions for storing the unstructured data and the structured data in a data structure based on the link.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 5 is a diagram of exemplary data structures.

DETAILED DESCRIPTION

The invention may be implemented in numerous ways, including as a system, a process, an apparatus, or as computer program instructions included on a computer readable medium such as a computer readable storage medium or a computer network wherein program instructions are sent over optical or electronic communication links.

A detailed description of one or more examples is provided below along with accompanying figures. The detailed description is provided in connection with such examples, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods and systems for processing structured data and unstructured data. As will be explained in more detail below, in one embodiment, unstructured data and structured data are captured and correlated to define links between the structured data and any associated unstructured data. The unstructured data and the structured data are stored in one or more data structures based on the link. As a result, both structured data and unstructured data are integrated into the data structure where such data may be collectively accessed.

Figure 1:
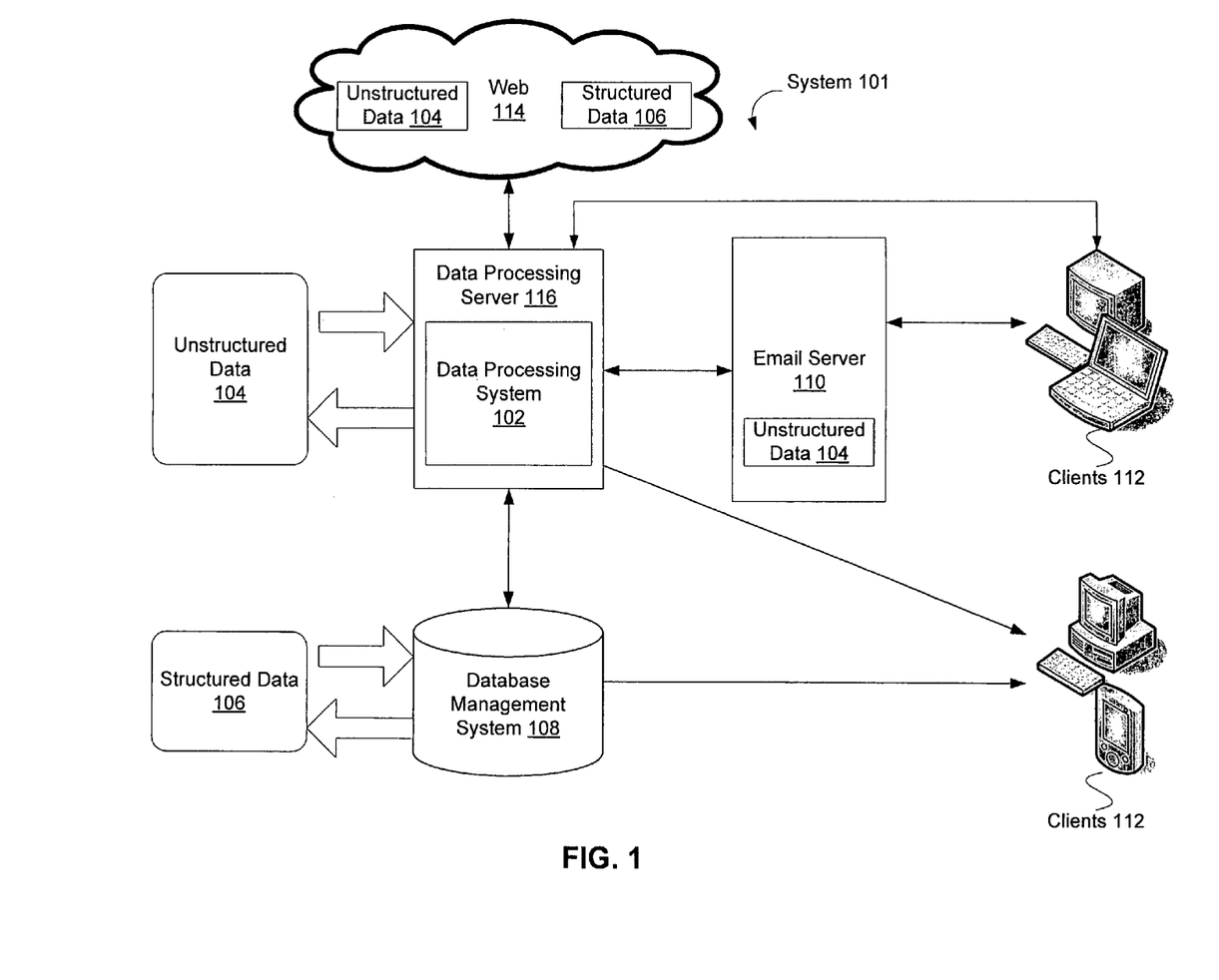
FIG. 1 is a simplified block diagram of an exemplary system for processing data.

FIG. 1 is a simplified block diagram of an exemplary system for processing data. As shown in FIG. 1, system 101 includes data processing server 116 in communication with database management system 108, email server 110, and clients 112. Data processing server 116, email server 110, and clients 112 may include any suitable types of computing devices. For example, the computing device can include a computer system based on a processing unit (e.g., a microprocessor) and a memory (e.g., random access memory, hard disk, optical media, and other memories), a portable computing device, a personal digital assistant, or a computational engine within an appliance. Data processing system 102 may be hosted on data processing server 116 that simultaneously provides services to multiple clients 112. Clients 112 can directly or indirectly rely on data processing server 116 for information and computational-intensive application tasks. Data processing system 102 can run on data processing server 116 that is dedicated for hosting the data processing system or may be adapted to run on a distributed execution environment where multiple data processing servers, such as data processing server 116, execute portions of the data processing system. In other words, data processing system 102 may be executed in a distributed fashion on separate data processing servers, such as data processing server 116.

Clients 112, data processing server 116, email server 110, and database management system 108 may be in communication through any suitable communication channel. For example, clients 112, data processing server 116, email server 110, and database management system 108 may be in communication through a computer network which includes any suitable types of wire or wireless communication channels capable of linking together computing nodes. Exemplary computer networks include packet-based computer data networks (e.g., Ethernet), wireless networks, Internet protocol (IP) networks, telephone networks, business process integration networks, peer-to-peer networks, Internet, and other computer networks.

As will be explained in more detail below, data processing system 102 includes program instructions and/or logic for processing unstructured data 104 and structured data 106. Unstructured data 104 refer to computerized information that are structured for storage in data structures associated with database management systems. Exemplary data structures include tables, multi-dimensional arrays, objects, and other data structures. Database management system 108 can include any suitable data management system that manages a collection of data in a data structure. Exemplary database management system 108 can include relational database management systems, network database management systems, dimensional database management systems, object database management systems, and other database management systems. In the context of relational database management systems, exemplary unstructured data 104 include data that are not structured for storage in rows and columns associated with a table. Other exemplary unstructured data 104 may include World Wide Web (Web) pages, image files, presentations, emails, spreadsheets, audio files, video files, word processor documents, electronic documents, and other unstructured data. Data processing system 102 can capture unstructured data 104 from a variety of suitable sources. In the exemplary system 101 of FIG. 1, data processing system 102 can capture unstructured data 104 from email server 110 and Web 114. Other exemplary suitable sources include voicemails, scanners, faxes, instant messengers, Web crawlers, medical imaging equipments, content addressed storage systems, enterprise content management systems, customer management systems, enterprise information systems, enterprise information integration, business performance management systems, database backup systems, content indexing software, video/audio streaming servers, customer relationship management software, and other suitable sources. Unstructured data 104 and/or structured data 106 may be captured by any suitable manner. For example, in one embodiment, capture can include copying unstructured data 104 and/or structured data 106 from a source. In other words, a snapshot of unstructured data 104 and/or structured data 106 may be taken from the source. In another exemplary embodiment, capture can include receiving unstructured data 104 and/or structured data 106 from a source.

Structured data 106, on the other hand, refer to data that are structured for storage in data structures associated with database management systems. For example, in the context of relational database management systems, structured data 106 refer to data that are structured for storage in rows and columns associated with a database management system table. Exemplary structured data 106 include a collection of records stored in database management system 108. Another exemplary structured data 106 include portions of data that can be queried using database management system programming languages, such as Structured Query Language (SQL), FOCUS, Hibernate Query Language (HQL), and other database management system programming languages. In contrast, portions of unstructured data 104 cannot be queried using database management system programming languages. Data processing system 102 can capture structured data 106 from a variety of suitable sources. For instance, in the exemplary system 101 of FIG. 1, data processing system 102 can capture structured data 106 from Web 114 and database management system 108.

Figure 2:
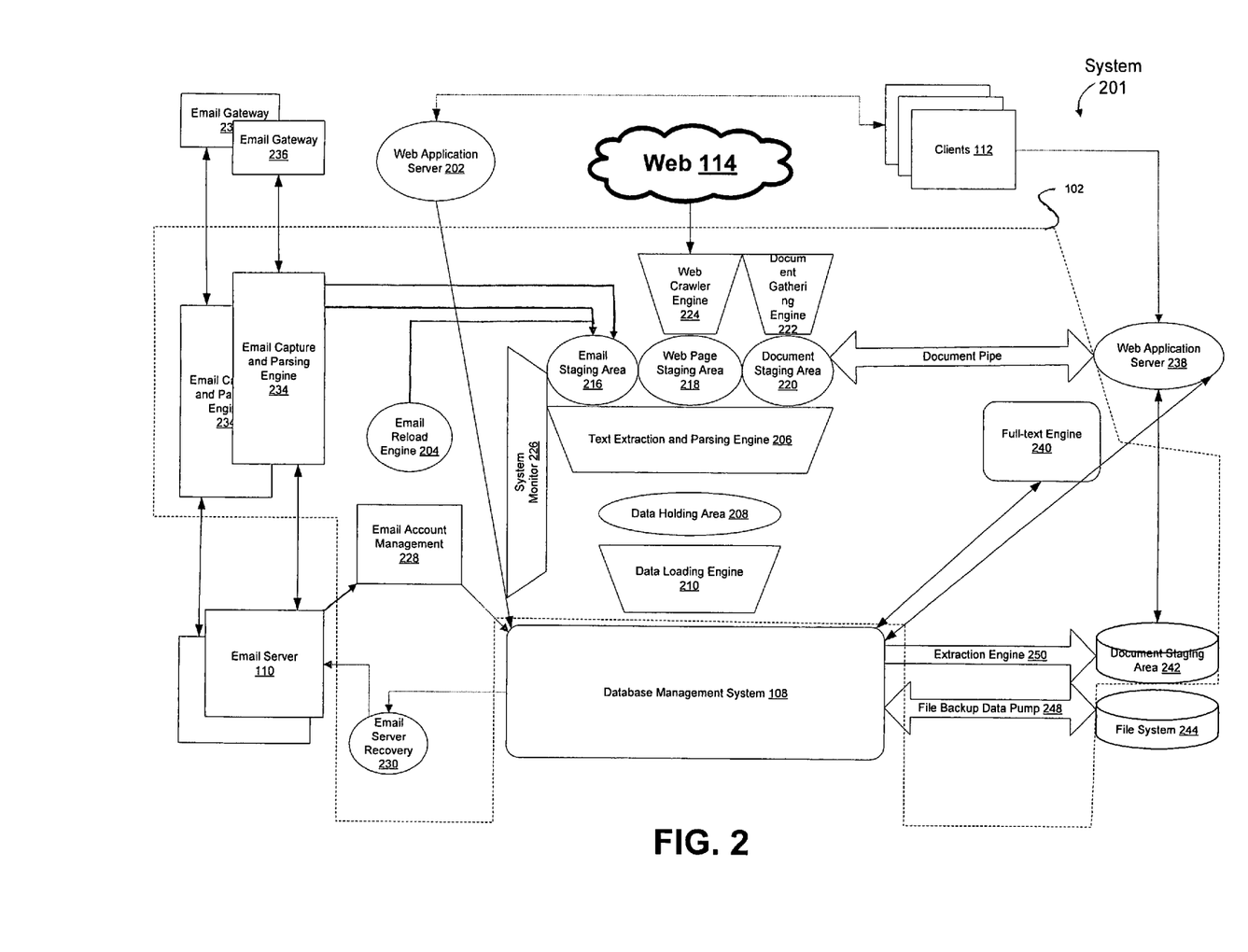
FIG. 2 is a more detailed block diagram of the exemplary data processing system shown in FIG. 1.

FIG. 2 is a more detailed block diagram of the exemplary data processing system shown in FIG. 1. As shown in FIG. 2, system 201 includes data processing system 102 directly and indirectly in communication with email server 110, Web application servers 202 and 238, Web 114, database management system 108, file system 244, and clients 112. Data processing system 102 may include Web crawler engine 224, document gathering engine 222, email staging area 216, Web page staging area 218, document staging areas 220 and 242, text extraction and parsing engine 206, data holding area 208, data loading engine 210, system monitor 226, email reload engine 204, email account management 228, email server recovery 230, full-text engine 240, extraction engine 250, email capture and parsing engine 234, and file backup data pump 248.

Data processing system 102 can capture data (e.g., structured data and unstructured data) from a variety of suitable sources. In the exemplary system 201 of FIG. 2, data processing system 102 can capture data from email server 110, Web application server 238, file system 244, and Web 114. To capture data from email server 110, email capture and parsing engine 234 captures emails and attachments outputted from email gateway 236 to the email server. Data processing system 102 can capture emails from any type of email server 110 that receives incoming emails and forwards outgoing emails for delivery. Exemplary email server programs (or mail transfer agents) executed on email server 110 can include Exim, Microsoft Exchange, qmail, Sendmail, and other mail server programs. Email capture and parsing engine 234 makes copies of the emails captured from email gateway 236 and transmits the emails to email server 110. Thus, email capture and parsing engine 234 intercepts and copies emails transmitted from email gateway 236 to email server 110. It should be appreciated that the transmitted emails may be in any suitable email-based protocol. Exemplary protocols used for the transmission of emails include Simple Mail Transfer Protocol (SMTP), Post Office Protocol 3 (POP3), Internet Message Access Protocol (IMAP), and other email protocols.

After the emails are captured and copied, email capture and parsing engine 234 may parse the copies of the emails, which is formatted in an email-based protocol, into a format that can be accepted by and stored in database management system 108. An exemplary parsing operation include email capture and parsing engine 234 dividing a copy of an email into sections such as attachments, body, and header. Another exemplary parsing operation include email capture and parsing engine 234 further dividing the header section into sections such as: (1) the email address and/or name of the sender of the email message (i.e., From); (2) the email addresses and/or name of the receiver of the email message (i.e. To); (3) a brief summary of the contents of the email message (i.e., Subject); (4) the time and date when the email message was sent (i.e., Date); and (4) email address and/or name of the receiver that is to receive a carbon copy of the email message (i.e., Cc).

In addition to capturing data from email server 110, data processing system 102 can capture data from Web 114, Web application server 238, and file system 244. To capture data from Web 114, in one embodiment, data processing system 102 may use Web crawler engine 224 to automatically browse the Web and to capture Web pages, which can include structured data and unstructured data. Web crawler engine 224 may include any suitable Web crawlers such as PolyBot, WebRACE, Web Information Retrieval Environment (WIRE), Internet Archive Crawler, and other Web crawlers. Document gathering engine 222 can capture additional data from a variety of suitable sources such as data warehouses, application servers (e.g., enterprise application servers and Web application server 238), file system 244, and other sources.

After data is captured, data processing system 102 places the data in email staging area 216, Web page staging area 218, or document staging area 220 for temporary storage. Email staging area 216, Web page staging area 218, and document staging area 220 are configured to temporarily store data associated with emails, Web pages, and electronic documents, respectively. In addition to captured data, email staging area 216 may capture data from email reload engine 204. Email reload engine 204 can load data associated with emails that are archived or stored on email servers and clients. In one embodiment, data processing engine 102 can initially capture data associated with emails from email reload engine 204 and subsequently, capture data associated with emails from email gateway 236. Thereafter, email staging area 216, Web page staging area 218, or document staging area 220 outputs the data to text extraction and parsing engine 206. Essentially, text extraction and parsing engine 206 extracts structured data from unstructured data. Text extraction and parsing engine 206 may include any suitable extraction applications. For example, an optical character recognition (OCR) application may be included to translate character images into machine-editable text. Text extraction and parsing engine 206 may additionally include voice recognition to translate digitized speech into machine-editable text. Other exemplary text extraction and parsing engine 206 includes face recognition software, scene recognition software, iris recognition software, text-to-voice translation software, voice verification software, signature application software, and other text extraction and parsing engines.

In one embodiment, in addition to extracting structured data from unstructured data, text extraction and parsing engine 206 can further transform the structured data using any suitable application programs. For example, text extraction and parsing engine 206 may include language translation software that translates extracted words and sentences into another language. Another example is the integration of a spell check application that corrects spellings of extracted words. Text extraction and parsing engine 206 may additionally include a grammar check application that automatically corrects the grammar of extracted text or include a natural language processing application that recognizes and transforms texts into computer commands. Math applications can additionally be included to apply math operations on extracted number and/or equations. In still another example, text extraction and parsing engine 206 may include data compression to encode the extracted data to a smaller size.

After text extraction and parsing engine 206 extracts structured data from the unstructured data, as will be explained in more detail below, the text extraction and parsing engine can correlate the structured data and the associated unstructured data to define a link between the structured data and the unstructured data. Text extraction and parsing engine 206 then outputs the unstructured data and the structured data to data holding area 208 for temporary storage and data loading engine 210 loads and stores the unstructured data and the structured data in database management system 108 based on the link. On the other hand, email account management 228 can bypass text extraction and parsing engine 206 to directly copy structured data from email server 110 to database management system 108. Web application server 202 can also bypass text extraction and parsing engine 206 to directly copy structured data from the Web application server to database management system 108.

In addition to capturing, correlating, and storing data in database management system 108, data processing engine 102 can include additional functions. As shown in FIG. 2, if data in email server 110 are lost or damaged, email server recovery 230 can copy the previously captured data associated with the email server from database management system 108 to the email server. Similarly, if data in file system 244 of a computing device are lost or damaged, previously captured data associated with the file system can be copied from database management system 108 to the file system via file backup data pump 248. Accordingly, data processing system 102 may be used as a backup system for data recovery.

The data from database management system 108 can additionally be copied to another data structure. In other words, the data from database management system 108 can be backed up to another data structure in the event that the data from the database management system are lost or damaged. Specifically, as shown in FIG. 2, extraction engine 250 and file backup data pump 248 can copy data from database management system 108 to document staging area 242 and file system 244, respectively. The data stored in file system 244 can be accessed by any suitable applications and/or systems. Exemplary applications and systems that may access the data include faxes, medical imaging equipments, video/audio streaming servers, surveillance applications, image processing applications, email organizer applications, legal discovery applications, litigation support applications, billing and customer-relationship-management applications, and other applications and systems. Another feature is full-text engine 240 that includes any suitable text search engine that can search texts stored in database management system 108. Exemplary text search engines include a text search engine that searches for strings of data and a context-sensitive text search engine. An additional feature included in data processing system 102 is system monitor 226 that basically checks the status of the modules (e.g., email staging area 216, text extraction and parsing engine 206, Web crawler engine 224, and other modules). For example, system monitor 226 can check whether there is enough space in email staging area 216, Web page staging area 218, document staging area 220, and data holding area 208. In another example, system monitor 226 can additionally verify for errors during load of data from data loading engine 210 to database management system 108.

Figure 3:
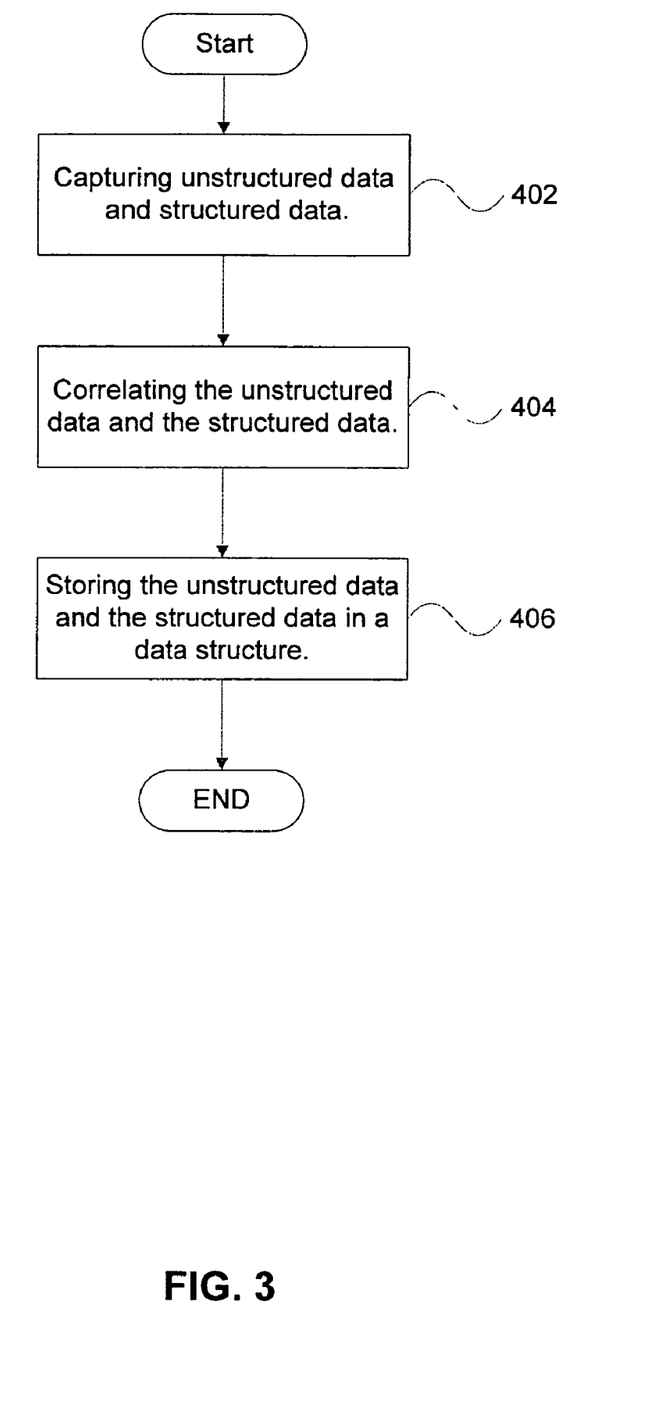
FIG. 3 is a is a flowchart diagram of a high level overview of an exemplary method for processing data.

FIG. 3 is a flowchart diagram of a high level overview of an exemplary method for processing data. As shown in FIG. 3, unstructured data and structured data are captured in operation 402 and here, the unstructured data is associated with the structured data. In one embodiment, the unstructured data and structured data can be captured from multiple sources. For example, the unstructured data and structured data can be captured from scanners, emails, and medical imaging equipments. Furthermore, unstructured data and structured data can be captured from multiple, different sources. In other words, unstructured data and structured data can be captured from multiple, distinct sources. An example includes capturing unstructured data and structured data from different sources such as Web crawlers and medical imagining equipments. Thereafter, the unstructured data and the structured data are correlated in operation 404 to define a link between the unstructured data and the structured data. In operation 406, the unstructured data and the structured data are then stored in a data structure based on the link. Thus, the data structure can store unstructured data and structured data from multiple sources. In one embodiment, as will be explained in more detail below, the unstructured data and the structured data are stored in the data structure such that the link is preserved in the data structure.

The storage of the unstructured data and the structured data in the data structure based on the link enables access of the structured data and the associated unstructured data from the data structure. Accordingly, the data structure may serve as a universal data warehouse. It should be appreciated that access of the structured data and the associated unstructured data from the data structure includes writing to, reading from, searching, erasing, and/or modifying the unstructured data and the structured data stored in the data structure. For example, in one embodiment, access can be limited to read operations without write operations such that the database management system may maintain data integrity.

Furthermore, in one embodiment, if multiple copies of the same unstructured data and structured data are captured, a single copy of the data can be stored in the data structure. For instance, when unstructured data and structured data are captured, the data processing system can compare the captured unstructured data and the captured structured data with the unstructured data and the structured data stored in the data structure. Exemplary comparisons include comparing the file size of the unstructured data and the structured data and comparing the checksums of the unstructured data and structured data. If the comparison shows that the captured unstructured data and the captured structured data are identical to the unstructured data and structured data stored in the data structure, then the captured unstructured data and the structured data are not stored in the data structure. Instead, additional correlation can be made to define additional links associated with the unstructured data and structured data stored in the data structure as applied to the captured unstructured data and structured data. Such comparison eliminates duplicate unstructured data and structured data stored in the data structure and reduces the size of the database management system.

Figure 4:
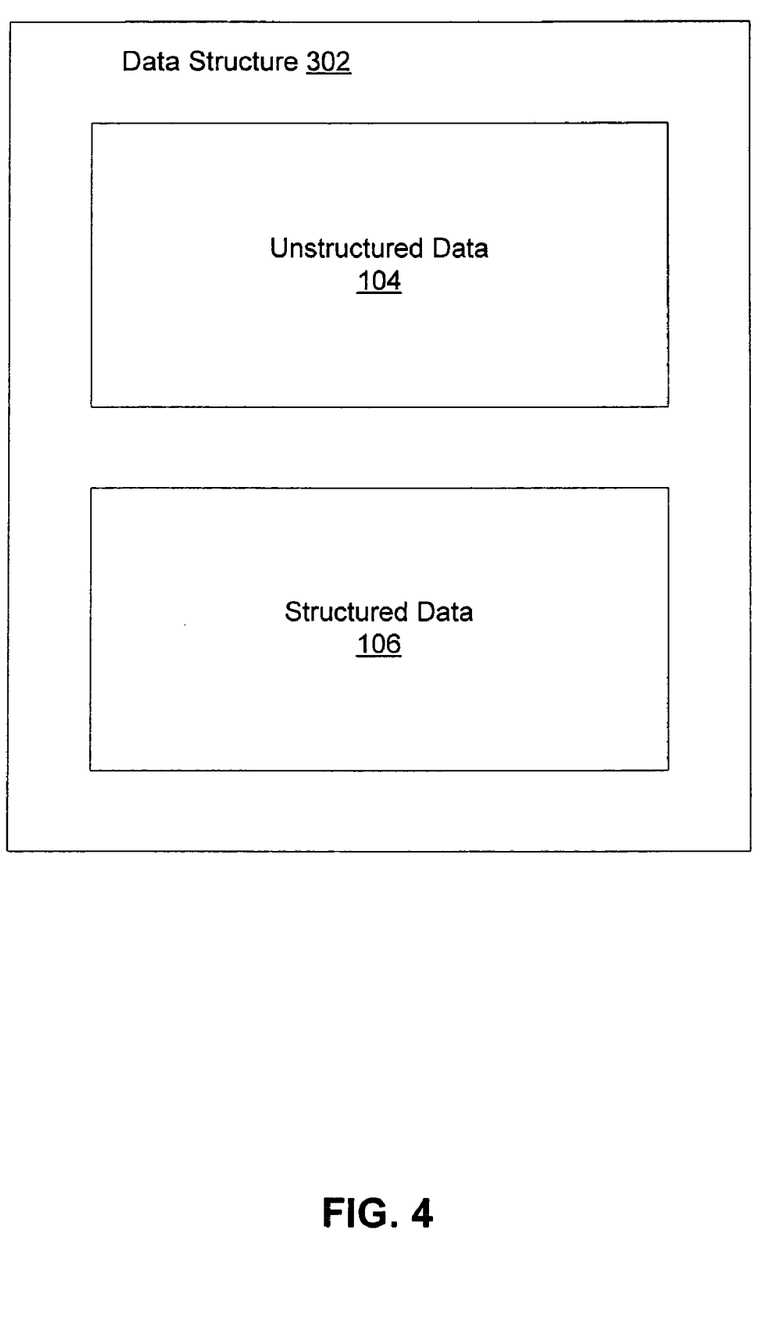
FIG. 4 is a simplified block diagram of an exemplary data structure.

FIG. 4 is a simplified block diagram of an exemplary data structure. As shown in FIG. 4. Unstructured data 104 and structured data 106 are stored in data structure 302. As discussed above, exemplary data structure 302 includes a table, a multi-dimensional array, an object, and other data structures. Unstructured data 104 and structured data 106 may or may not be associated with or related to the other unstructured data and structured data. For example, the different sections (e.g., header, body, attachments, and other sections) of an email are associated with each other because the different sections are from the same email. However, sections of another email message may not be associated with the same email because the sections are from a different email. If unstructured data 104 is associated with structured data 106, then the unstructured data and the structured data are correlated to define a link between the unstructured data and the structured data. Correlation is the establishment of a relationship between unstructured data 104 and/or structured data 106. For instance, in the email example discussed above, the different sections of an email are related by correlation because the different sections are from the same email. It should be appreciated that any suitable correlation techniques to establish a relationship between unstructured data 104 and/or structured data 106 may be used. Exemplary correlation techniques include cross-correlation, normalized cross-correlation, phase correlation, and other correlation techniques.

In one embodiment, the link between unstructured data 104 and structured data 106 is preserved in data structure 302. Data structure 302 can include any suitable types of links. An exemplary link may be a pointer stored in data structure 302 that points to another associated data structure or record. In database management system tables, relationships between tables may not be defined explicitly, but keys, which are collections of one or more columns in tables whose values match corresponding columns in other tables, may be used to link rows of unstructured data and structured data in different tables. In a hierarchal data structure, the storage of unstructured data 104 and structured data 106 at different levels of the data structure establishes a hierarchal link between the unstructured data and the structured data.

It should be appreciated that links may be additionally established between structured data 106 or between unstructured data 104. For example, a first structured data can be extracted from a first unstructured data that is associated with a second structured data. Accordingly, the first structured data also is associated with the second structured data because the first unstructured data is associated with the second structured data. In this example, the first structured data, the second structured data, and the first unstructured data can be correlated to define a link between the first structured data, the second structured data, and the first structured data. As a result of preserving the links in data structure 302, the retrieval of any structured data 106 can also result in the retrieval of associated unstructured data 104.

FIG. 5 is a diagram of exemplary data structures. Here, FIG. 5 shows data structures in the form of tables 501-507 with exemplary names and data types associated with each table row. Tables 501-507 store an exemplary collection of unstructured data and structured data that may be processed by a data processing system. In particular, message header table 501, message recipients table 502, message attachments table 503, message long text table 504, and attachment text table 505 are configured to store unstructured data and structured data associated with emails. Docs table 506 and texts table 507 are configured to store unstructured data and structured data associated with electronic documents.

As discussed above, tables 501-507 can store unstructured data and/or structured data. For example, in the context of emails, message header table 501 is configured to store structured data associated with email headers. As shown in FIG. 5, exemplary structured data associated with email headers include email identification (MAIL_ID 520), email subject (SUBJECT 521), and time when email was received (RECEIVE_TIME 522). Message long text table 504 is configured to store structured data associated with email bodies. An exemplary structured data associated with email bodies include the text of the message (MESSAGETEXT 523). Message attachments table 503 is configured to store structured data and unstructured data associated with email attachments. An exemplary structured data associated with email attachments is the title of the attachment (ATTACHMENT_TITLE 524) and an exemplary unstructured data associated with email attachments is the attachment in binary format (ATTACHMENT 525). In addition to unstructured data and structured data, in one embodiment, tables 501-507 can also store objects (e.g., tags, Extensible Markup Language (XML) metadata, and other objects) associated with email unstructured data and structured data. The objects may be used for version control, determining the number of times the email was forwarded, and other operations associated with emails. With the objects, operations may be conducted on the objects instead of operating on the email unstructured data and the structured data.

Figure 6:
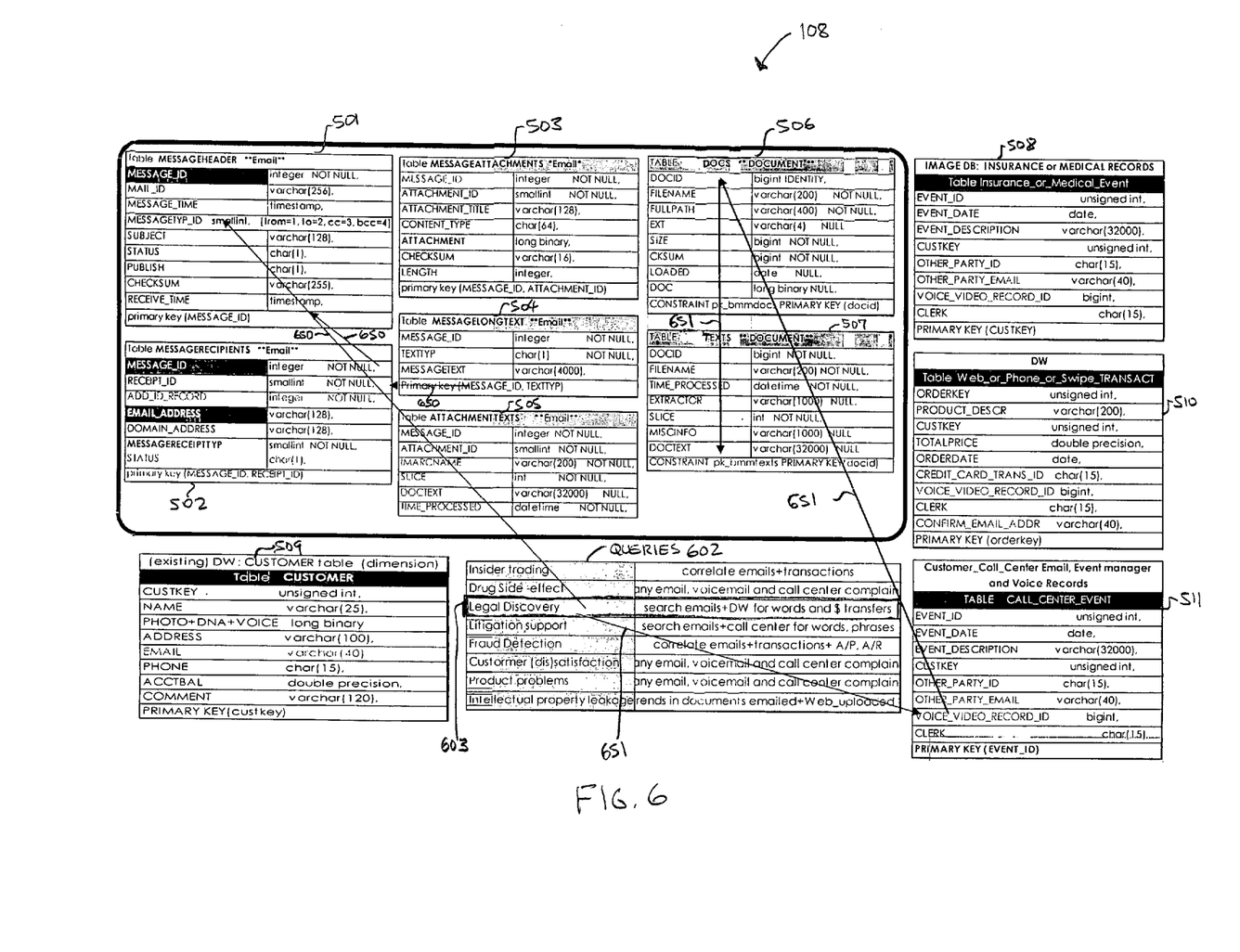
FIG. 6 is a diagram of the exemplary data structures shown in FIG. 5 as linked to other, exemplary data structures within a database management system.

FIG. 6 is a diagram of the exemplary data structures shown in FIG. 5 as linked to other, exemplary data structures within a database management system. In addition to tables 501-507 shown in FIG. 5, data processing system may additionally process other data structures such as tables 508-511 stored in database management system 108. As discussed above, tables 501-505 are associated with emails and tables 506-507 are associated with electronic documents, database management system 108 may additionally include table 509 associated with customer data, table 508 associated with insurance or medical records data, table 510 associated with Web or phone transactions data, and table 511 associated with call center events data. It should be appreciated that any suitable link may be defined between tables 501-511. For example, queries 602 show a list of exemplary queries (i.e., requests for information) that may be processed by data processing system. In the context of legal discovery query 603, the legal discovery query may request information from emails, Web or phone transactions, and call center events. As shown by reference lines 650, data processing system may access message header table 501 and additionally message long text table 504 and message recipients table 502 that are linked to the message header table. If legal discovery query 603 requests information from call center events, reference lines 651 show that data processing system can access table 511 associated with call center events data and can additionally access tables 506 and 507 associated with electronic documents that are linked to the table associated with call center events data.

Figure 7:
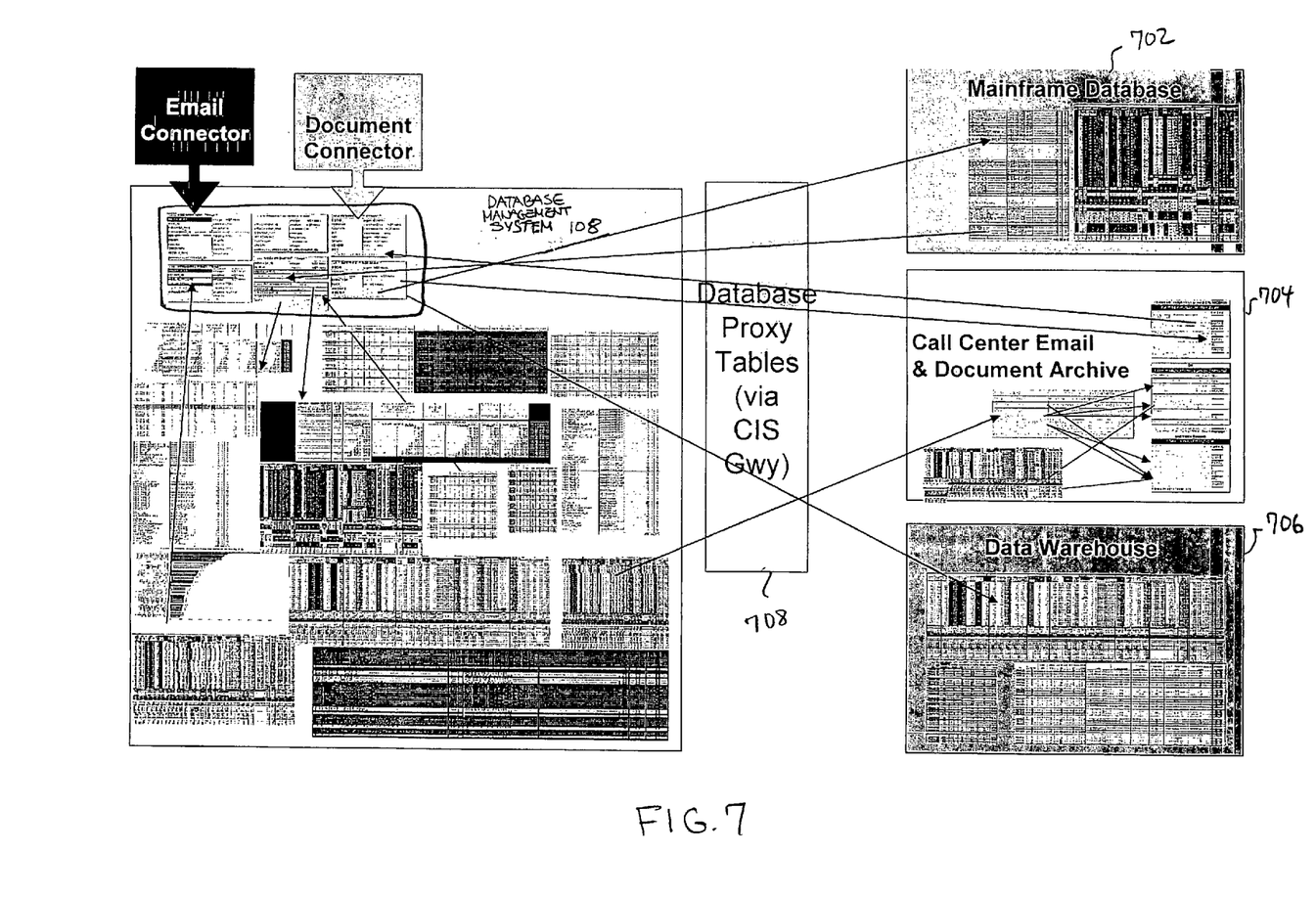
FIG. 7 is a diagram of exemplary data structures accessible by data processing system.

In addition to accessing data from database management system 108, data processing system can additionally access remote data structures. FIG. 7 is a diagram of exemplary data structures accessible by data processing system. In one embodiment, data processing system can access data from remote database management systems. As shown in FIG. 7, such remote database management systems include mainframe database management system 702, call center email and document archive 704, and data warehouse 704. Data processing system may access mainframe database management system 702, call center email and document archive 704, and data warehouse 706 through any suitable connectivity tools. In the example of FIG. 7, data processing system may use database management system proxy tables 708 to access mainframe database management system 702, call center email and document archive 704, and data warehouse 706 by means of Component Integration Services (CIS) gateway, which is a set of connectivity tools that can be used to access data within a heterogeneous environment.

Figure 8:
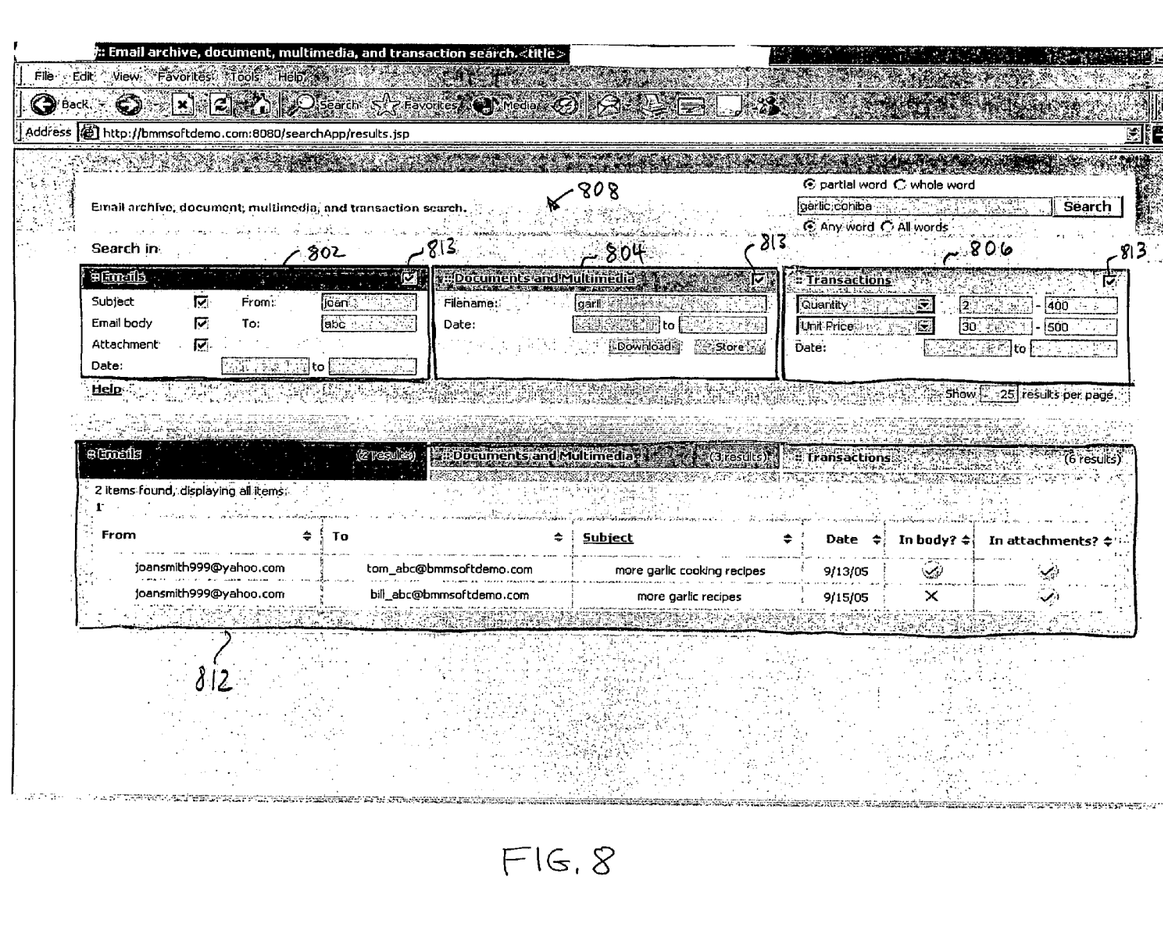
FIG. 8 is a diagram of an exemplary graphical user interface for searching information.

FIG. 8 is a diagram of an exemplary graphical user interface (GUI) for searching information. After data processing system processes the data, the data may be searched and retrieved. Any suitable GUI may be used to search and retrieve the data. For example, as shown in FIG. 8, main window region 808 is displayed on a display coupled to a computing device. Main window region 808 includes search regions 802, 804, and 806 and results region 812. Email search region 802 allows the input of data associated with emails. Documents and multimedia search region 804 allows the input of data associated with electronic documents and multimedia (e.g., audio files and video files). Transactions search region 806 allows the input of data associated with transactions. Results region 812 displays the results of the search.

As shown in FIG. 8, unstructured data and/or structured data may be searched from sources such as emails, documents, multimedia, and/or transactions. To designate the source to search, a user can click on check box region 813 associated with each region 802, 804, or 806. After a search of the inputted data is conducted, results region 812 displays the structured data and/or unstructured data from the search. In the example of FIG. 8, to conduct a search, the terms "joan" and "abc" are inputted into email search region 802, the term "garli" is inputted into document and multimedia search region 804, and ranges 2-400 and 30-500 are inputted into transactions search region 806. All three check box regions 813 are checked. As a result, as shown in results region 812, data processing system searches and retrieves two emails, three documents, six transactions and any structured data and/or unstructured data (e.g., email attachments) associated with the emails, documents, multimedia, and transactions.

It should be appreciated that any number of suitable layouts can be designed for region layouts illustrated above as FIG. 8 does not represent all possible layout options available. The displayable appearance of the regions can be defined by any suitable geometric shape (e.g., rectangle, square, circle, triangle, and other shapes), alphanumeric character (e.g., A,v,t, Q,1,9,10, and other alphanumeric characters), symbol (e.g., $,*,@,Θ,→,⌑,♥, and other symbols), shading, pattern (e.g., solid, hatch, stripes, dots, and other patterns), and color. Furthermore, for example, check box regions 813, or any other region, may be omitted or dynamically assigned. The regions can be fixed or customizable and the computing devices may have a fixed set of layouts, utilize a defined protocol or language to define a layout, or an external structure can be reported to the computing device that defines a layout.

Finally, clicking on a region of GUI as discussed above triggers code to cause the functionality described herein.

In summary, the above-described embodiments provide methods and systems for processing structured data and unstructured data. The integration of unstructured data and structured data into a data structure enables a single application (i.e., data processing system) to access both the unstructured data and the structured data. Accordingly, such integration enables cross-technology access and, in effect, allows a user to access data from multiple single function solutions. In other words, the integration provides a unified view of structured data and unstructured data from different single function solutions (i.e., different sources). For example, a user can retrieve data from both emails and Web pages through a single application. In another example, through a single application, a user can search and analyze data from archived electronic documents, emails, and faxes. In addition to the retrieved data, the data processing system also allows a user to instantly access any associated content (e.g., Web pages, image files, audio files, and other contents). Through the integration of unstructured data and structured data, the access of data through a single application can be more cost effective, more reliable, and made more quickly when compared to accessing data with the use of multiple single source solutions. Furthermore, storing unstructured data and structured data in a data structure (e.g., a table) provides protection against malicious threats (virus, worms, etc.) that are not configured to target data structures.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer implemented method for processing data, the method comprising:

(a) executing, on a data processing, programming for providing a plurality of data processing modules, said data processing modules comprising:

an e-mail capture and parsing engine for intercepting, copying, and processing e-mails transmitted from a gateway to an email server, said processing comprising dividing a copy of an email into sections including at least a header section and a body section, and dividing the header section into sections comprising one or more of sender email address, sender name, recipient email address, recipient name, summary of email contents, date the email was sent, or time the email was sent;

an email reload engine for loading data associated with archived or stored emails;

a web crawler engine for Internet crawling and capturing Internet web pages;

a document gathering engine for capturing data from external sources comprising one or more of an application data warehouse, application server, or file system;

one or more data staging areas for temporary storage of data associated with said email capture and parsing engine, said web crawler engine, and said document gathering engine;

a text extraction and parsing engine for receiving data from said data staging areas, extracting structured data from unstructured data, and correlating extracted structured data and associated unstructured data to define a link between said structured data and said associated unstructured data;

a data holding area for temporary storage of said structured data and said unstructured data from said text extraction and parsing engine;

a data loading engine for loading and storing into a database management system said structured data and said unstructured data from said data holding area based on said link;

an email account management engine for bypassing said text extraction and parsing engine and directly copying structured data from said email server to said database management system;

(b) using said plurality of data processing modules, carrying out operations comprising:

capturing unstructured data from an unstructured data source and structured data from a structured data source, the unstructured data being associated with the structured data, wherein the unstructured data source and the structured data source are each associated with at least an email, the email including a header;

parsing the header into at least a sending email address, a receiving email address, a date and time of transmission associated with the email, and a carbon copy email address;

evaluating the email using the email capture and parsing engine, wherein the email capture and parsing engine generates a summary of content associated with the email, the sending email address, the receiving email address, the date and the time of transmission associated with the email, the carbon copy email address, and a summary used to classify the email;

correlating the unstructured data and the structured data to establish a link between the unstructured data and the structured data, wherein the link integrates the unstructured data and the structured data; and storing the unstructured data and the structured data in a first data structure, wherein the unstructured data is stored in an unstructured portion of the first data structure, wherein the structured data is stored in a structured portion of the first data structure, wherein the link is preserved in the first data structure, and wherein the storing of the unstructured data and the structured data enables access of the unstructured data and the structured data from the first data structure.

2. The method of claim 1, wherein the unstructured data is captured from an email server.

3. The method of claim 1, wherein the structured data is captured from a data warehouse.

4. The method of claim 1, further comprising copying the unstructured data and the structured data from the first data structure to a second data structure.

5. The method of claim 1, wherein the first data structure is stored in a remote database management system.

6. A computer readable storage medium having computer instructions executable on a computer for carrying out operations, comprising:

(a) providing a plurality of data processing modules, said data processing modules comprising:

an e-mail capture and parsing engine for intercepting, copying, and processing e-mails transmitted from a gateway to an email server, said processing comprising dividing a copy of an email into sections including at least a header section and a body section, and dividing the header section into sections comprising one or more of sender email address, sender name, recipient email address, recipient name, summary of email contents, date the email was sent, or time the email was sent;

an email reload engine for loading data associated with archived or stored emails;

a web crawler engine for Internet crawling and capturing Internet web pages;

a document gathering engine for capturing data from external sources comprising one or more of an application data warehouse, application server, or file system;

one or more data staging areas for temporary storage of data associated with said email capture and parsing engine, said web crawler engine, and said document gathering engine;

a text extraction and parsing engine configured for receiving data from said data staging areas, extracting structured data from unstructured data, and correlating extracted structured data and associated unstructured data to define a link between said structured data and said associated unstructured data;

a data holding area for temporary storage of said structured data and said unstructured data from said text extraction and parsing engine;

a data loading engine for loading and storing into a database management system said structured data and said unstructured data from said data holding area based on said link;

an email account management engine configured for bypassing said text extraction and parsing engine and directly copying structured data from said email server to said database management system; and (b) using said plurality of data processing modules, carrying out operations comprising:

capturing unstructured data from an unstructured data source and a first structured data from a structured data source, a first portion of the unstructured data being associated with the first structured data, wherein the unstructured data source and the structured data source are each associated with at least an email, the email including a header;

parsing the header into at least a sending email address, a receiving email address, a date and time of transmission associated with the email, and a carbon copy email address;

evaluating the email using the email capture and parsing engine, wherein the email capture and parsing engine generates a summary of content associated with the email, the sending email address, the receiving email address, the date and the time of transmission associated with the email, the carbon copy email address, and a summary used to classify the email;

extracting a second structured data from the first portion of the unstructured data;

correlating the first and second structured data to establish a first link between the first and second structured data, wherein the first link integrates the first and second structured data; and storing the first and second structured data in a structured portion of a data structure, wherein the first link is preserved in the data structure.

7. The computer readable storage medium of claim 6, further comprising computer instructions for:

correlating a second portion of the unstructured data and the second structured data to define a second link between the second portion of the unstructured data and the second structured data; and storing the second portion of the unstructured data in an unstructured portion of the data structure, the second link being preserved in the data structure.

8. The computer readable storage medium of claim 6, further comprising storing the first and second structured data to enable access to the first and second structured data from the data structure.

9. The computer readable storage medium of claim 6, wherein extracting the second structured data from the first portion of the unstructured data further comprises translating character images from the first portion of the unstructured data into text stored in the second structured data.

10. The computer readable storage medium of claim 6, wherein extracting the second structured data from the first portion of the unstructured data further comprises interpreting digitized speech from the first portion of the unstructured data into text stored in the second structured data.

11. A computer implemented system for processing data associated with an e-mail, the system comprising:

(a) a data processing unit;

(b) programming, executable by said data processing unit, for providing a plurality of data processing modules, said data processing modules comprising:

an e-mail capture and parsing engine for intercepting, copying, and processing e-mails transmitted from a gateway to an email server, said processing comprising dividing a copy of an email into sections including at least a header section and a body section, and dividing the header section into sections comprising one or more of sender email address, sender name, recipient email address, recipient name, summary of email contents, date the email was sent, or time the email was sent;

an email reload engine for loading data associated with archived or stored emails;

a web crawler engine for Internet crawling and capturing Internet web pages;

a document gathering engine for capturing data from external sources comprising one or more of an application data warehouse, application server, or file system;

one or more data staging areas configured for temporary storage of data associated with said email capture and parsing engine, said web crawler engine, and said document gathering engine;

a text extraction and parsing engine for receiving data from the data staging areas, extracting structured data from unstructured data, and correlating extracted structured data and associated unstructured data and a to define a link between said structured data and said associated unstructured data;

a data holding area configured for temporary storage of said structured and said unstructured data from said text extraction and parsing engine;

a data loading engine for loading and storing into a database management system said structured data and said unstructured data from said data holding area based on said link;

an email account management engine for bypassing said text extraction and parsing engine and directly copying structured data from said email server to said database management system;

(c) wherein said plurality of data processing modules are configured for carrying out operations comprising:

receiving unstructured data and structured data from a plurality of sources comprising an unstructured data source and a structured data source, the unstructured data being associated with the structured data, wherein the unstructured data source and the structured data source are each associated with at least an email, the email including a parsing the header into at least a sending email address, a receiving email address, a date and time of transmission associated with the email, and a carbon copy email address;

evaluating the email using an email capture and parsing engine, wherein the email capture and parsing engine is configured to generate a summary of content associated with the email, the sending email address, the receiving email address, the date and the time of transmission associated with the email, the carbon copy email address, and a summary used to classify the email;

correlating the unstructured data and the structured data to establish a link between the unstructured data and the structured data, wherein the link integrates the unstructured data and the structured data; and storing the unstructured data and the structured data in a data structure based on the link, wherein the unstructured data is stored in an unstructured portion of the data structure and wherein the structured data is stored in a structured portion of the data structure.

12. The system of claim 11, wherein the storing the unstructured data and the structured data further comprises enabling access of the unstructured data and the structured data from the data structure.

13. The system of claim 11, wherein the data structure stores the unstructured data and the structured data associated with an email.

14. The system of claim 13, wherein the data structure stores the structured data associated with an email header.

15. The system of claim 13, wherein the data structure stores the structured data associated with an email body.

16. The system of claim 13, wherein the data structure stores the unstructured data associated with an email attachment.

17. The system of claim 11, wherein the data structure is stored in a remote database management system.

18. The system of claim 11, wherein the data structure stores the unstructured data and the structured data associated with an electronic document.

19. The system of claim 11, wherein the data processing module further comprises computer instructions for translating a portion of the unstructured data into another language before storing the portion in the data structure.

20. The system of claim 11, wherein the structured portion of the data structure stores data in Extensible Markup Language format.

* * * * *